(12) United States Patent
Campean

(10) Patent No.: US 9,423,212 B2
(45) Date of Patent: Aug. 23, 2016

(54) REFLEX SIGHT ADJUSTMENTS

(71) Applicant: Leupold & Stevens, Inc., Beaverton, OR (US)

(72) Inventor: Daniel I. Campean, Portland, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 4 days.

(21) Appl. No.: 14/596,129

(22) Filed: Jan. 13, 2015

(65) Prior Publication Data

US 2015/0198415 A1 Jul. 16, 2015

Related U.S. Application Data

(60) Provisional application No. 62/037,458, filed on Aug. 14, 2014, provisional application No. 61/926,818, filed on Jan. 13, 2014.

(51) Int. Cl.
| | |
|---|---|
| *F41G 1/00* | (2006.01) |
| *F41G 1/30* | (2006.01) |
| *F41G 1/16* | (2006.01) |
| *G02B 23/14* | (2006.01) |
| *F41G 1/18* | (2006.01) |

(52) U.S. Cl.
CPC . *F41G 1/30* (2013.01); *F41G 1/16* (2013.01); *F41G 1/18* (2013.01); *G02B 23/14* (2013.01)

(58) Field of Classification Search
CPC .............. F41G 1/30; F41G 1/16; F41G 1/18; F41G 1/34; F41G 1/38
USPC .............................. 42/137, 90, 124, 126, 113
See application file for complete search history.

(56) References Cited

U.S. PATENT DOCUMENTS

| | | | | |
|---|---|---|---|---|
| 4,494,328 A | * | 1/1985 | Stevens .................... | F41C 27/00 42/115 |
| 4,665,622 A | * | 5/1987 | Idan ........................ | F41G 1/30 356/252 |
| 4,742,636 A | * | 5/1988 | Swan ..................... | F41G 11/006 42/126 |
| 5,363,559 A | * | 11/1994 | McCarty ................. | F41G 1/38 33/298 |
| 5,467,552 A | * | 11/1995 | Cupp ........................ | F41G 1/26 42/125 |
| 5,625,954 A | * | 5/1997 | DePaoli ................... | F41G 1/345 42/113 |
| 5,653,034 A | * | 8/1997 | Bindon .................. | G02B 23/105 33/297 |
| 5,813,159 A | * | 9/1998 | Kay .......................... | F41G 1/30 42/113 |
| 5,815,936 A | * | 10/1998 | Sieczka .................... | G03H 1/00 359/1 |

(Continued)

*Primary Examiner* — Michelle R Clement
(74) *Attorney, Agent, or Firm* — Stoel Rives LLP

(57) ABSTRACT

A battery compartment for a reflex sight is accessed via a pivoting lid that can be unlatched, opened, and closed by hand without tools and without removing the sight from its weapon. A button carried by the lid actuates a switch within the sight for changing a setting of the sight. Also disclosed is a reflex sight having mounting structures for accessories, such as an impact guard, a rain hood, or a rear iron sight for example. Positioning mechanisms for an LED or other aiming point display device of an aiming sight are also disclosed.

10 Claims, 12 Drawing Sheets

(56) References Cited

U.S. PATENT DOCUMENTS

| | | | |
|---|---|---|---|
| 6,327,806 B1 | 12/2001 | Paige | |
| 6,418,657 B1* | 7/2002 | Brown | F41G 1/26 42/124 |
| 6,490,060 B1* | 12/2002 | Tai | G02B 5/32 33/333 |
| 7,145,703 B2* | 12/2006 | Sieczka | F41G 1/30 356/247 |
| 7,916,290 B2 | 3/2011 | Koehler | |
| 8,082,688 B2* | 12/2011 | Elpedes | F41G 1/14 42/131 |
| 8,099,897 B2* | 1/2012 | Elpedes | F41G 1/14 42/131 |
| 8,109,031 B2* | 2/2012 | Tang | G02B 27/0101 42/113 |
| 8,151,510 B2* | 4/2012 | Capson | F41G 1/01 42/111 |
| 8,215,050 B2* | 7/2012 | Elpedes | F41G 1/14 42/123 |
| 8,443,541 B2* | 5/2013 | Elpedes | F41G 1/14 42/113 |
| 8,448,374 B2* | 5/2013 | Samson | F41G 1/18 42/125 |
| 8,966,805 B2* | 3/2015 | Koesler | F41G 1/30 42/111 |
| 2007/0234625 A1* | 10/2007 | Kidd | F41G 1/02 42/111 |
| 2008/0092424 A1* | 4/2008 | Keng | F41G 1/28 42/137 |
| 2008/0216379 A1* | 9/2008 | Javorsky | F41G 1/345 42/115 |
| 2010/0077646 A1 | 4/2010 | Gaber et al. | |
| 2012/0085014 A1* | 4/2012 | Riley | F41G 11/004 42/115 |
| 2014/0096431 A1* | 4/2014 | Tang | F41G 1/30 42/132 |
| 2014/0237884 A1* | 8/2014 | Koesler | F41G 1/30 42/119 |
| 2014/0305022 A1* | 10/2014 | Chung | F41G 1/16 42/113 |
| 2015/0267997 A1* | 9/2015 | Collin | G03H 1/0005 359/1 |

* cited by examiner

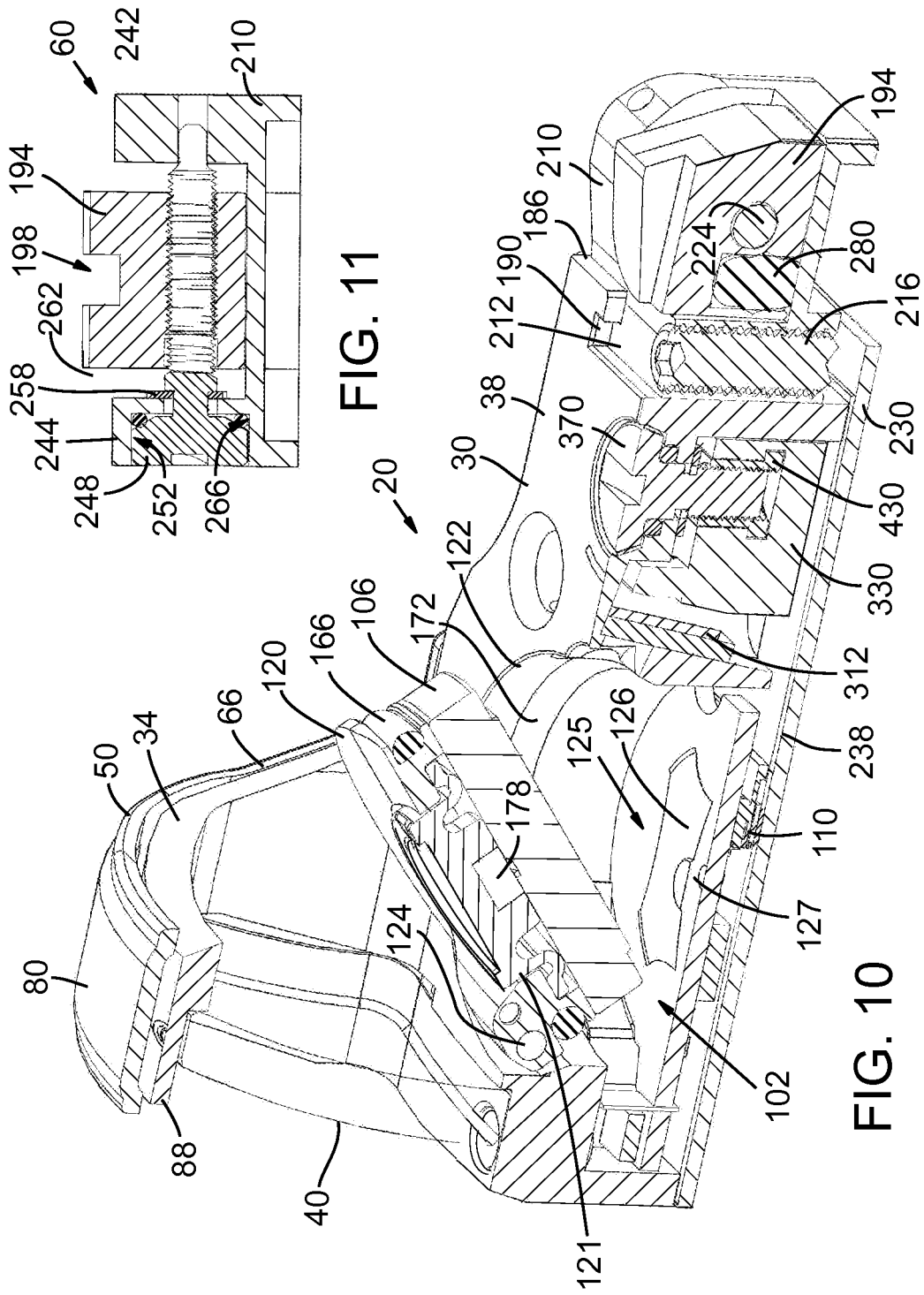

REFLEX SIGHT ADJUSTMENTS

RELATED APPLICATIONS

This application claims the benefit of priority under 35 U.S.C. §119(e) from U.S. Provisional Patent Application Nos. 61/926,818, filed Jan. 13, 2014, and 62/037,458, filed Aug. 14, 2014, both of which are incorporated herein by reference.

TECHNICAL FIELD

The field of the present disclosure relates to optical aiming devices and, in particular, to compact reflex sights for handguns, rifles and the like.

BACKGROUND

Miniature reflex sights, also commonly known as mini red-dot sights, are non-magnifying reflector sights that are commonly used with handguns and small armaments such as rifles and crossbows. Reflex sights are also used for other aiming purposes, for example, as a finder scope for use with a telescopes. Reflex sights typically include a partially reflecting transparent element, such as a lens or flat glass element, that the user looks through to view a target and an illuminated aiming mark or reticle pattern that is superimposed on the field of view. In a reflex sight utilizing a reflecting lens element, the aiming mark is typically generated by a small light emitting diode at the focal point of the lens, the latter of which is selectively reflective to the wavelength of the illumination. In reflex sights including a flat glass element, the aiming mark is generated by an illumination source directed through collimating optics toward the flat glass element.

U.S. Pat. No. 6,327,806 of Paige describes a reflex sight and a method of manufacturing its lens element. Other similar reflex sights are described in U.S. Pat. No. 8,082,688 of Elpedes et al. and U.S. Pat. No. 7,916,290 of Koehler.

The present inventor has recognized a need for an improved reflex sight having features especially desirable for tactical users.

SUMMARY

In one embodiment, a reflex sight for a handgun includes a battery compartment for a button cell that powers the illumination electronics of the sight. The battery compartment is accessed via a pivoting lid located on a top surface of a housing of the sight between a reflecting element of the sight and an aiming mark illumination source. The pivoting lid is retained by a spring latch that can be operated by hand without tools and without removing the reflex sight from the weapon, as is the case with many prior art reflex sights wherein the compartment or access door is located on an underside of the sight. When closed, the lid is preferably sealed to the housing by an O-ring that is compressed between the lid and the compartment opening when the lid is retained by the spring latch. The lid is preferably biased upwardly by a spring so that when the latch is released, the lid is urged open. A magnet may be mounted to the underside of the lid to magnetically lift a button cell battery from the battery compartment when the lid is opened. The button cell is preferably movable within the battery compartment by depressing a selector button carried by the lid to thereby actuate an electrical switch that controls a setting of the reflex sight. The switch may comprise a miniature metal dome switch contact that also serves as one of the battery contacts.

In another embodiment, a reflex sight includes one or more mounting features for accessories, such as an impact guard, a rain hood, or a rear iron sight, for example. In some embodiments, threaded holes along left and right side walls of a main housing of the sight receive screws that attach accessories that may extend over the top of the sight. For example, an impact guard may be attached over a lens frame of the housing in which the optical element is mounted. The impact guard may be sized and shaped so that when the impact guard is mounted to the threaded holes, a gap remains between the underside of the impact guard and an arched or flat top region of the lens frame. This gap provides room for the impact guard to flex and absorb the energy of an impact, which may prevent damage to the optical element. A T-slot, dovetail slot, rail, or other elongate mounting structure may be provided at a rear end of the reflex sight for slidably mounting other accessories thereto, such as an auxiliary rear iron sight (open sight). An accessory rear iron sight may be co-witnessed with the illuminated aiming mark of the reflex sight and a front iron sight of the weapon, allowing the user to quickly switch or alternate with speed and confidence between the two sighting systems, and to provide a backup aiming device in the event of a failure of the reflex sight electronics, for example. The rear iron sight may include a traveler block slidably mounted to the T-slot or rail and vertically adjustable therealong by an adjustment screw. The rear iron sight may be attached to the traveler block by a laterally-extending horizontal adjustment screw for effecting horizontal or "windage" adjustments in the rear iron sight. It is envisioned that reflex sight may include other accessory mounting features for mounting additional or different accessories not described herein.

Also disclosed is a positioning mechanism for an aiming point display device of an aiming sight, such as a miniature LED that generates an aiming mark reflected in the optical element of a reflex sight. A base of the aiming device has an elongate cavity formed therein providing a platform relative to which the positioning system adjusts the position of the aiming point display device. The aiming point display device is supported on a carriage that is slidably received in the elongate cavity. The carriage has formed therein an undercut slot extending along a first axis of motion. An elevation adjustment screw is rotatably supported on the base and extends into the cavity along a second axis of motion perpendicular to the first axis of motion. An elevation block is slidably received in the undercut slot of the carriage and threaded onto the elevation adjustment screw for movement along the second axis of motion. At least one sizer bearing is interposed between the bottom of the undercut slot and the elevation block, so that the sizer bearing takes up slop between the elevation block and the undercut slot while allowing the carriage to slide along the first axis of motion relative to the elevation block. The sizer bearing may be a self-lubricating plain bearing block or pad formed of a resinous material. The positioning system also includes a windage adjustment screw rotatably supported on the base and extending into the cavity along the first axis of motion to adjust the carriage along the first axis of motion. A spring may be provided to urge the carriage toward the windage adjustment screw. A pusher block may be threaded onto the windage adjustment screw and push against the carriage to drive the carriage along the first axis of motion in response to rotation of the adjustment screw. An optional second sizer bearing may be interposed between the carriage and a wall of the elongate cavity of the body to take up slop along a third axis perpendicular to the first and second axes of motion.

Additional aspects and advantages will be apparent from the following detailed description of preferred embodiments, which proceeds with reference to the accompanying drawings.

BRIEF DESCRIPTION OF THE DRAWINGS

FIG. 10 is a isometric left side section view of the reflex sight of FIG. 1 taken along line 10-10 in FIG. 5 with a battery compartment lid illustrated in the open position.

FIG. 11 is a section view of the reflex sight of FIG. 1 taken along line 11-11 of FIG. 5 to show detail of a rear iron sight mounting block and horizontal adjustment screw.

DETAILED DESCRIPTION OF PREFERRED EMBODIMENTS

This section describes particular embodiments and their detailed construction and operation. The embodiments described herein are set forth by way of illustration only and not limitation. Throughout the specification, reference to "one embodiment," "an embodiment," or "some embodiments" are not necessarily all referring to the same embodiment. The described features, structures, characteristics, and methods of operation may be practiced in isolation or combined in any suitable manner, and can be practiced without one or more of the specific details or with other methods, components, materials, or the like. In other instances, well-known structures, materials, or methods of operation are not shown or not described in detail to avoid obscuring more pertinent aspects of the embodiments.

Figure 1:
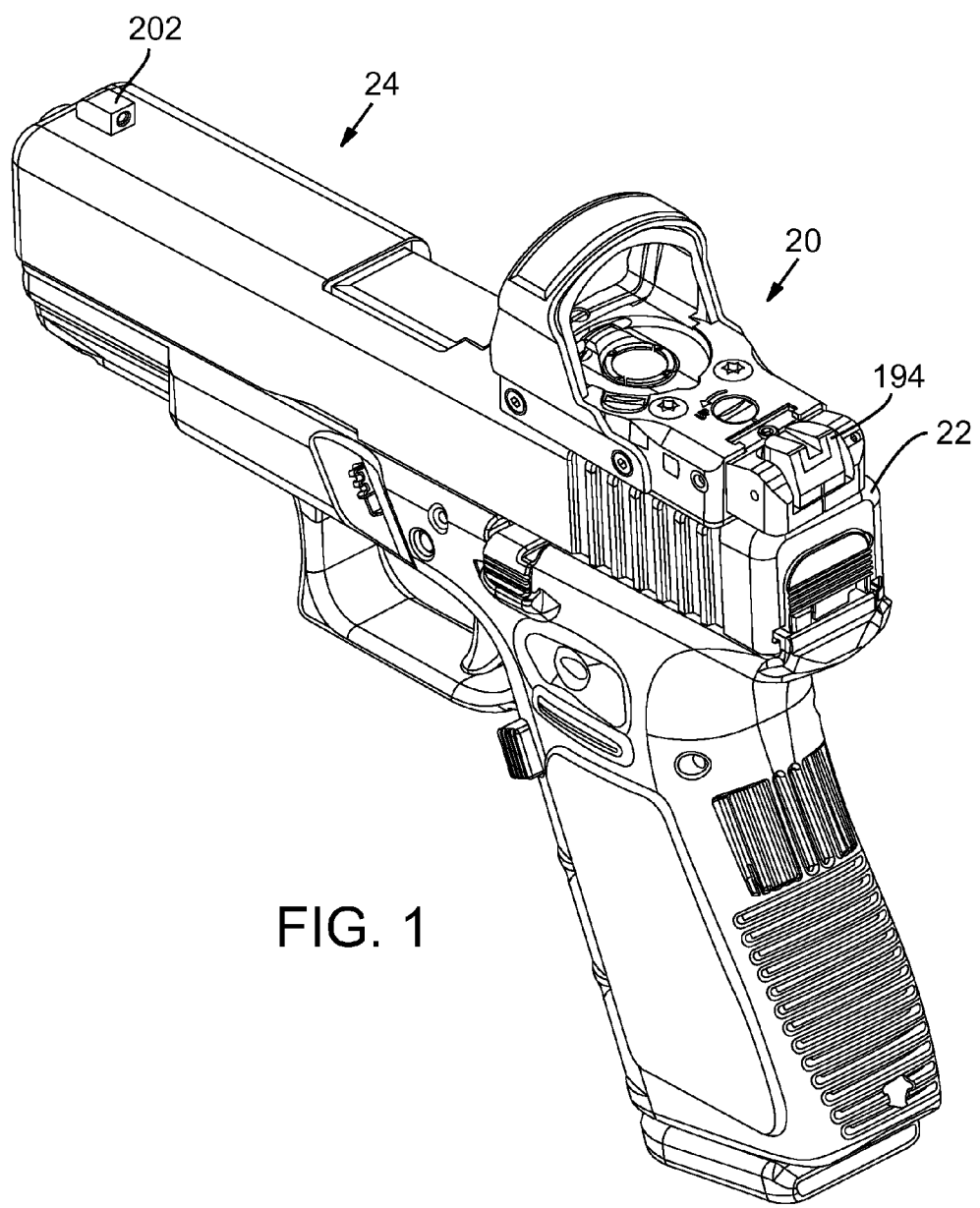
FIG. 1 is an isometric view of a reflex sight according to the present disclosure, mounted to a handgun.
Figure 2:
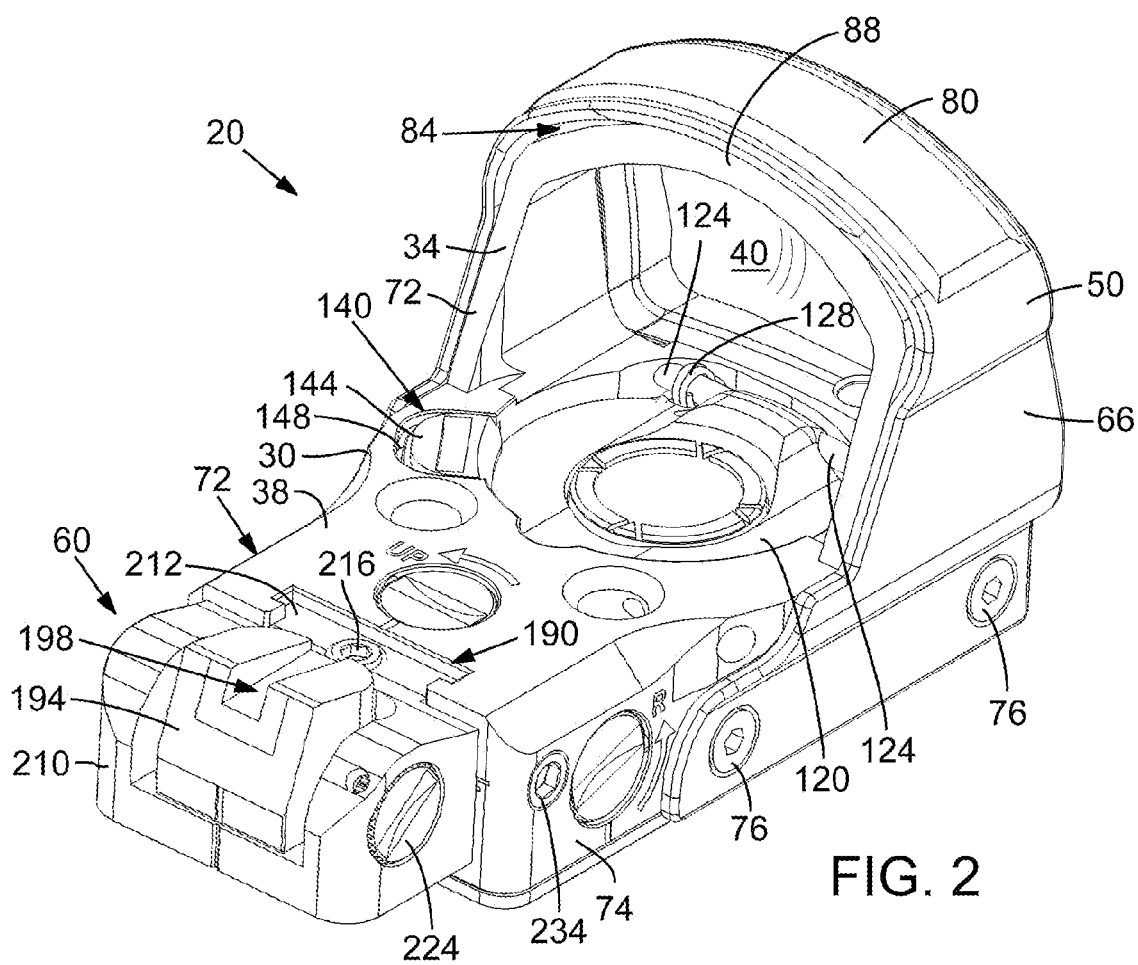
FIGS. 2, 3, 4, 5, 6, 7, and 8 are respective right side isometric, left side isometric, left side elevation, top, rear elevation, front elevation and right side elevation views of the reflex sight of FIG. 1.
Figure 3:
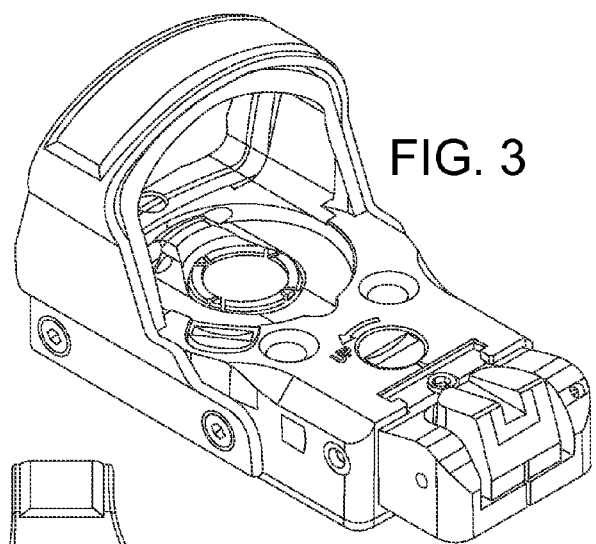
Figure 16:
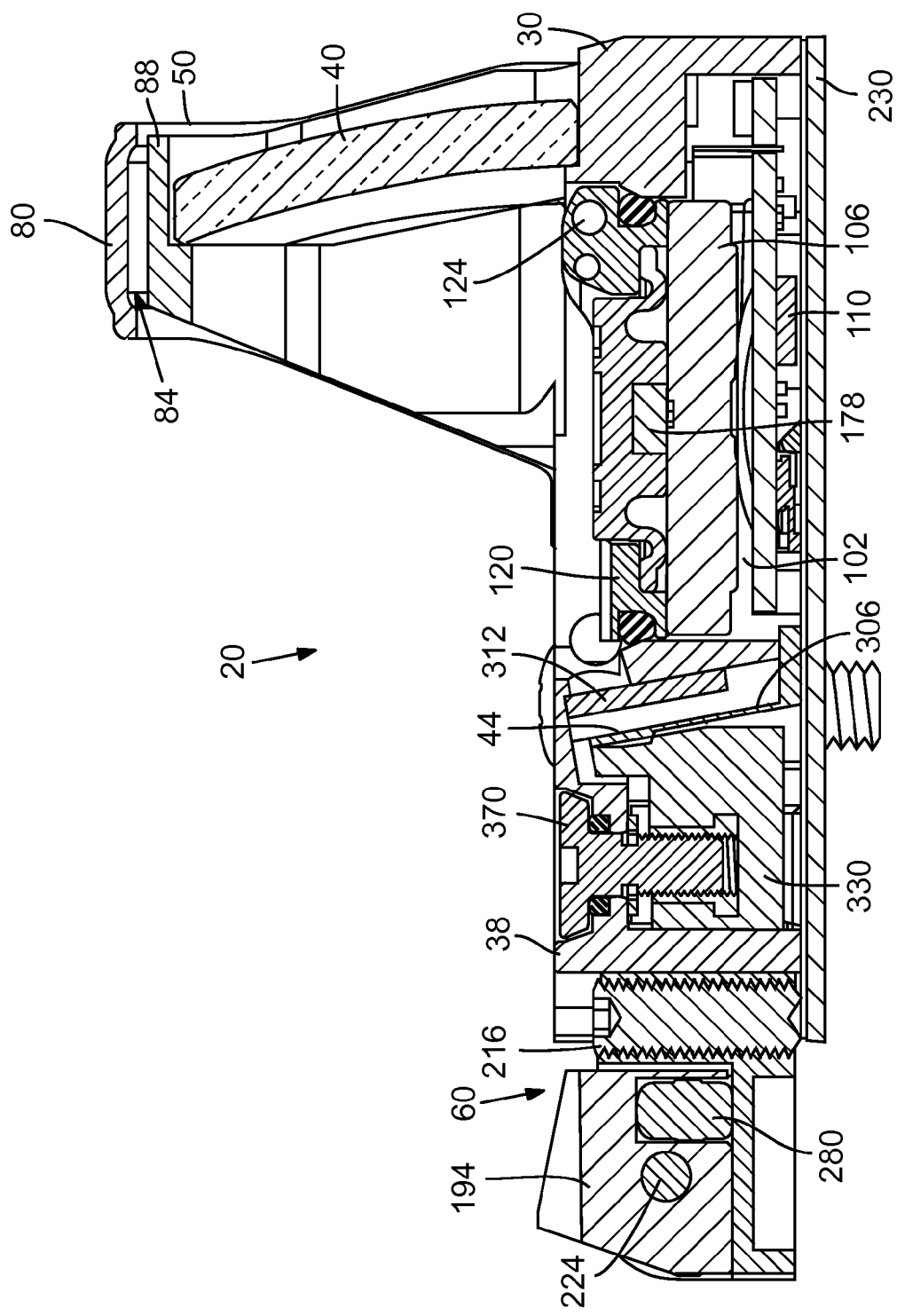
FIG. 16 is a side section elevation of the reflex sight of FIG. 1 taken along line 16-16 of FIG. 7 to show detail of the positioning mechanism.

FIG. 1 illustrates a reflex sight 20 in accordance with a presently preferred embodiment, mounted to a slide 22 of a semi-automatic pistol 24. With reference to FIGS. 1-2, reflex sight 20 includes a body 30 that serves as a housing for electronics and other devices described herein, and as a mounting platform for accessory devices as described below with reference to FIGS. 2, 10-11, and 18. Body 30 includes an upwardly extending frame 34 forming a loop with a lower base portion 38 of body 30. An optical element in the form of a non-magnifying lens 40 is mounted in a generally upright position in a forward portion of frame 34, providing a viewing window for a target field of view. Light emitted from a miniature light emitting diode (LED) 44 (FIGS. 12, 16) positioned at a focal point rearward of lens 40 and within base portion 38 of body 30 is reflected rearward toward the user's eye by a dichroic reflection layer or coating of lens 40 as collimated light, so that the user perceives the reflected light as an illuminated aiming mark 46 (FIG. 6) superimposed on the field of view at infinite distance.

With reference to FIG. 2, reflex sight 20 includes optional removable accessories, including an impact guard 50 that serves as a bumper to protect lens 40, and a rear iron sight module 60 described in greater detail below with reference to FIGS. 10-11. Impact guard 50 includes left and right upstanding legs 64, 66 that are attached to left and right side walls 72, 74 of body 30 via screws 76 threaded into threaded accessory mounting holes 78 (FIG. 18) in side walls 72, 74. Impact guard 50 also includes a bumper portion 80 extending between upper ends of legs 64, 66 and over frame 34. Impact guard 50 and especially bumper portion 80 are preferably sized, shaped, and/or configured to leave a gap 84, best shown in FIG. 16, between an underside of bumper portion 80 and an arched top portion 88 of frame 34. Gap 84 provides room for bumper portion 80 of impact guard 50 to flex and absorb the energy of an impact, which may prevent damage to lens 40 in the event of an impact. Impact guard 50 may be made of any suitable strong and energy absorbing material, such as spring steel or high strength plastic resin. In an alternative embodiment (not illustrated), impact guard 50 may be made of an elastomeric material of relatively high durometer forming an armored layer on a portion of body 30, in which case impact guard 50 may directly abut top portion 88 of frame 34 so as to leave no gap therebetween.

Accessory mounting holes 78 may also provide attachment points for different accessory items, such as a rain hood (not illustrated) that may be mounted over reflex sight 20 to inhibit rain from contacting lens 40 and distorting or shifting the location of the aiming mark 46 reflected in lens 40. The rain hood may extend over the top and sides of substantially all of reflex sight 20 and perhaps forward and rearward thereof. The rain hood may be mounted to reflex sight 20 instead of impact guard 50, or may be used in conjunction with impact guard 50 by mounting the rain hood over or under impact guard 50 with each of the screws 76 retaining both the rain hood and impact guard 50 to body 30. In one embodiment, the rain hood may include transparent front and rear windows having a hydrophobic or hydrophilic coating that prevents droplets of water from obscuring the optical transmission therethrough. Other types of accessory items mountable to one or more of the mounting holes 78 may include a laser gunsight, a flashlight, a canting indicator such as a bubble level, a range finder, a camera, and/or a display device for images, video and/or data, and any other appropriately sized item that may be desired for use with reflex sight 20 or with the handgun or other aimed device to which reflex sight 20 is mounted.

Figure 9:
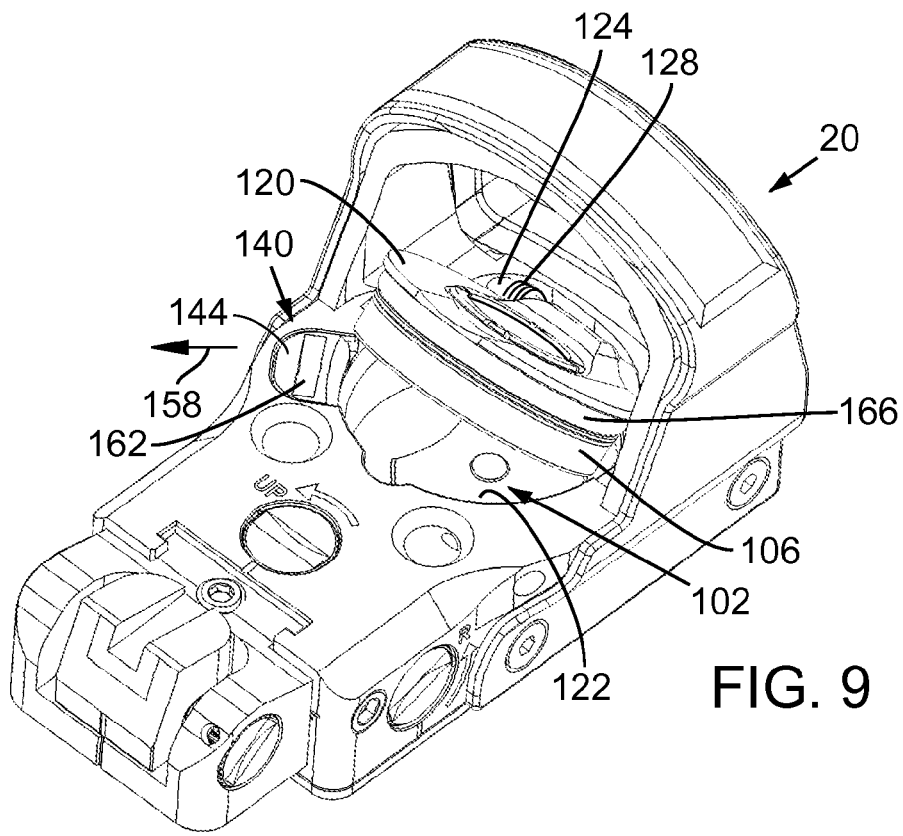
FIG. 9 is a pictorial view of the reflex sight of FIG. 1 illustrating a battery compartment lid being opened for replacing a button cell battery.

Turning now to FIGS. 9 and 10, base portion 38 of body 30 defines a battery compartment 102 that houses a button cell 106 that powers electronics 110 (illustrated in FIGS. 12 and 16) that drive LED 44. Battery compartment 102 is accessed via a pivoting lid 120 that covers an opening 122 to compartment 102 located on base portion 38 between lens 40 and LED 44. Lid 120 pivots about a hinge pin 124 that is fitted into body 30 along a forward edge of opening 122 and is biased upwardly by a helical torsion spring 128 that is also carried by hinge pin 124 and operably interposed between body 30 and lid 120. Lid 120 is retained in its closed position illustrated in FIGS. 1-8 by a spring latch 140 including a latch button 144 slidably mounted in a slot 148, best illustrated in FIG. 18, that adjoins opening 122 to battery compartment 102. Lid 120 may be recessed below the surface of base portion 38 to provide a clear optical path for illumination generated by LED 44 to reach lens 40. Slot 148 may have undercut sidewalls or an inverted T-shaped cross section (not illustrated) to slidably retain latch button 144 therein for movement in a generally horizontal radial direction from opening 122. A latch spring 152 (FIG. 18) is seated in a bore 156 in the base of slot 148 and extends into a pocket (not shown) on an underside of latch button 144 to urge latch button 144 to the latched position illustrated in FIGS. 1-8, where an inner lip of latch button 144 extends over lid 120 to retain lid 120 in its closed position. Latch 140 is operable to provide access to battery compartment 102 to replace button cell 106 without removing reflex sight 20 from weapon 24 or otherwise disturbing its aim. Latch 140 is released by sliding the latch button 144 outwardly in slot 148 in the direction illustrated by arrow 158 in FIG. 9, thereby allowing lid 120 to be urged open by torsion spring 128 or another biasing device. A small slot or notch 162 is provided in a top of latch button 144 to assist in grasping latch button 144 with a user's fingernail for toolless opening, or with the rim of a cartridge, a coin, or another tool. When closed, lid 120 is preferably sealed to body 30 by an O-ring 166 that is compressed between lid 120 and a tapered surface 172 (FIG. 10) bordering opening 122. O-ring 166 is preferably fitted in a channel encircling lid 120 and prevents moisture and debris from entering battery compartment 102 when lid 120 is closed. FIG. 10 includes a cross section of lid 120, and shows a magnet 178 that may be mounted to the underside of lid 120 to magnetically lift button cell 106 from battery compartment 102 when lid 120 is opened.

Figure 6:
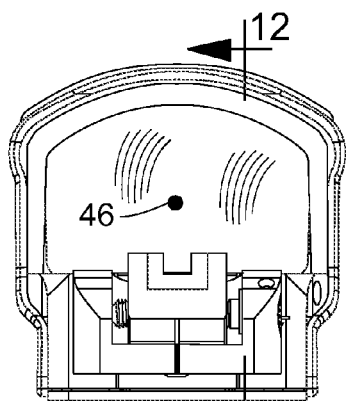
Figure 4:
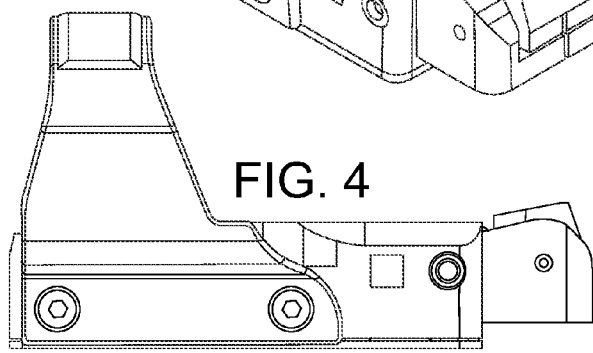
Figure 7:
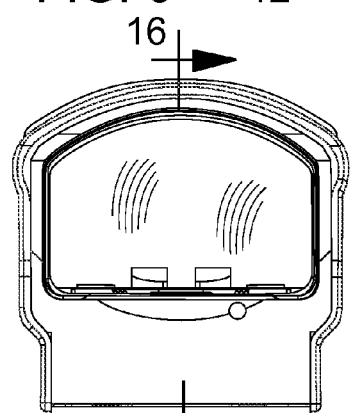

With reference to FIG. 10, lid 120 includes a setting switch 125 including a selector button 121 formed of an elastomeric or flexible plastic material that is manually depressible to actuate switch 125 and thereby control a setting of sight 20. Selector button 121 may allow a gloved user to control of a setting of the sight 20, such as an illumination mode, illumination brightness, reticle pattern, or other attribute of illuminated aiming mark 46 (FIG. 6). Button cell 106 is movable within battery compartment 102 in response to manually depressing selector button 121, and a central region of selector button 121 is depressible to push button cell 106 downwardly against a miniature metal dome switch contact 126 that forms the moving contact in a miniature snap-action switch or microswitch. Depressing selector button 121, button cell 106 and dome switch contact 126 causes dome switch contact 126 to flex so that a central portion thereof comes into electrical contact with a contact pad 127 on an upper side of a circuit board carrying electronics 110, thereby closing the setting switch 125. Dome switch contact 126 also preferably serves as a battery contact. When the downward force on selector button 121 is released, the dome switch contact 126 provides a spring return force that automatically returns button cell 106 and selector button 121 to their initial position.

Selector switch 125 provides signal input to electronics 110 and may allow a user to cycle through various illumination settings of sight 20. For example, in one embodiment, selector button 121 is depressed to toggle between an automatic mode and one or more manual modes for an illumination setting of aiming mark 46. In an automatic mode, a light sensor (not shown) of sight 20 may measure ambient light and a brightness control circuit may automatically determine and set an appropriate illumination intensity of aiming mark 46 based on the measured ambient light. In a manual mode, the user may cycle through various illumination settings by manually depressing selector button 121 multiple times until a desired light intensity level is obtained. In some embodiments, depressing selector button 121 may cycle through several settings in sequence, including: ON (Auto), high intensity, medium intensity, low intensity, and OFF.

Figure 21:
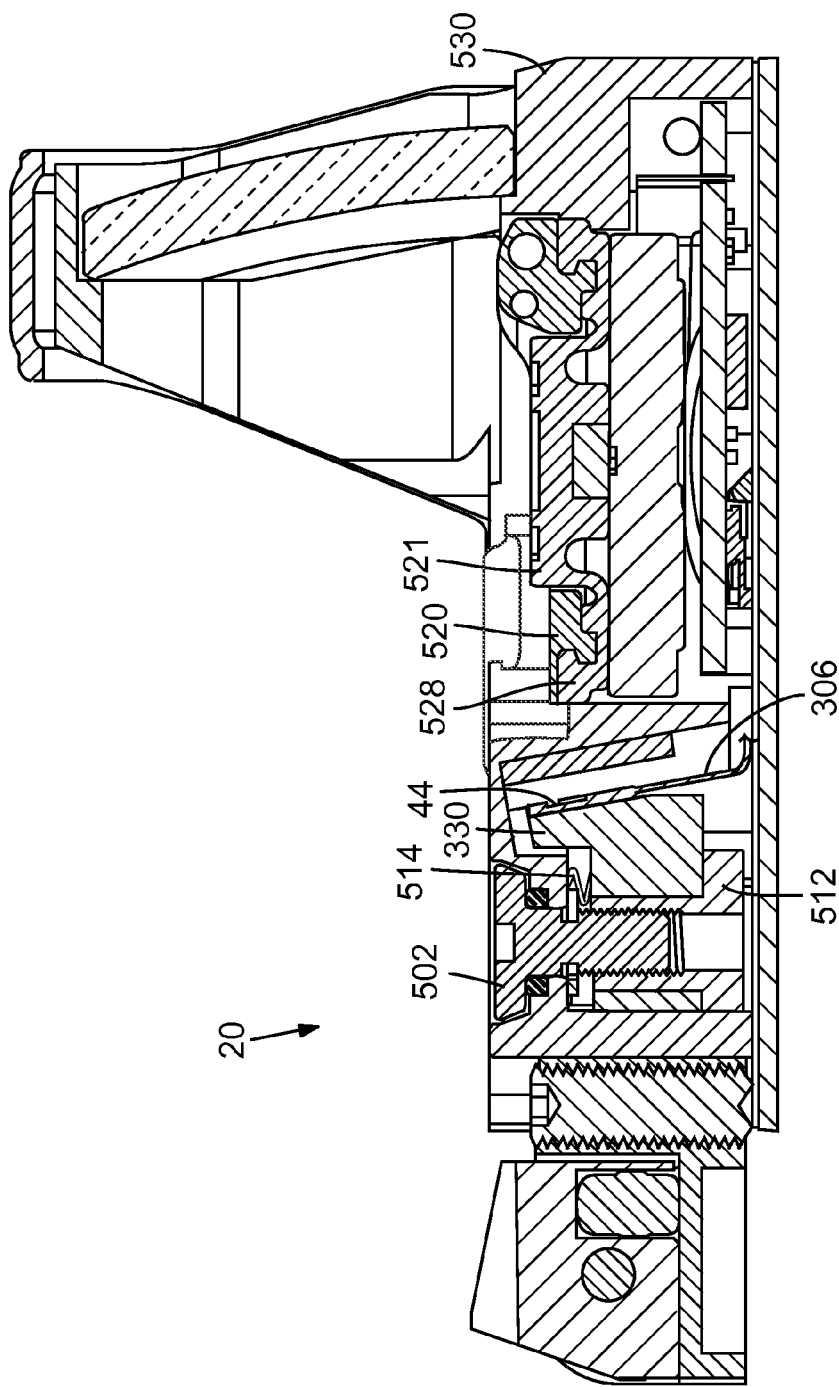
FIG. 21 is an enlarged longitudinal section view showing additional detail of the positioning mechanism of FIG. 19.

Turning briefly to FIG. 21, another embodiment of selector button 521 includes a gasket portion 528 that extends underneath lid 520 and encircles lid 520 to provide a hermetic seal between lid 520 and body 530 and to prevent moisture and debris from entering the battery compartment when lid 520 is closed. Thus, selector button 521 of FIG. 22 serves the function of both the button 121 and O-ring 166 of the embodiment of FIGS. 9 and 10.

Figure 9A:
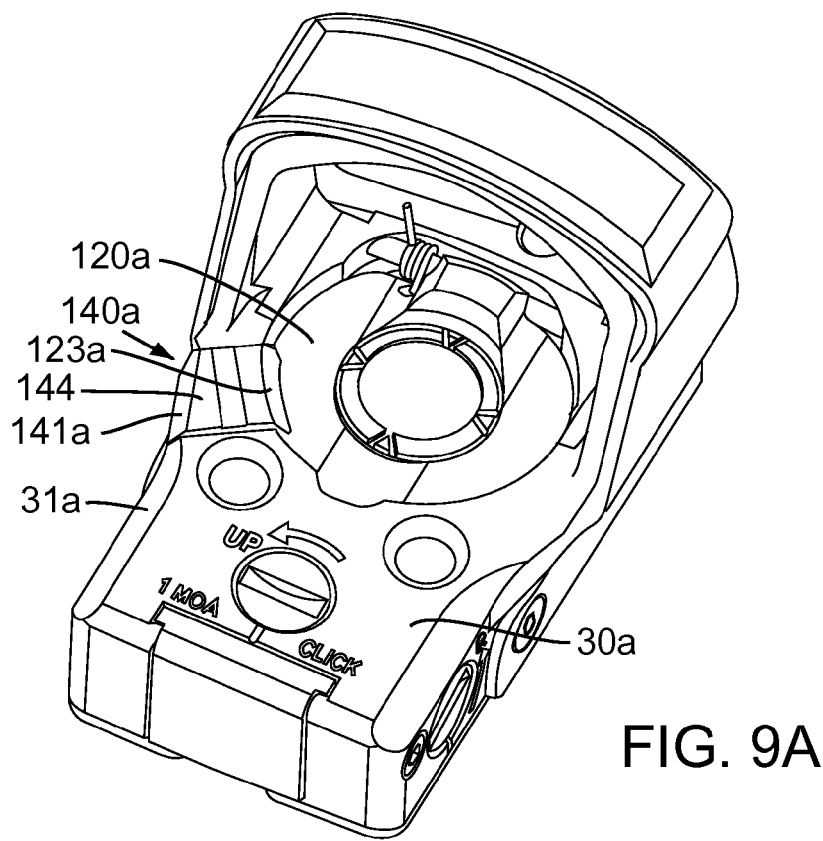
FIG. 9A is a pictorial view of another embodiment of the reflex sight with a battery compartment lid and latch having features to indicate a state of the latch.

FIG. 9A illustrates another embodiment of a spring latch 140*a* for battery compartment lid 120*a*, shown in its unlatched but closed state. In the embodiment of FIG. 9A, spring latch 140*a* is manually operable to unlatch lid 120*a* and provide access to the battery compartment in a similar fashion as described with reference to FIG. 9. A latch slide 144*a* rides in a through slot 148*a* such that an end 141*a* of latch slide 144*a* is visible on an exterior surface 31 *a* of body 30*a*. In such arrangement, the position of latch slide 144*a* relative to exterior surface 31*a* provides a quick-reference tactile and visual indication to the user whether latch 140*a* is in a latched or unlatched position. When latch 140*a* is in the latched position (not shown), an outer end 141*a* of latch slide 144*a* is aligned with and is substantially flush with exterior surface 31*a* of body 30*a*, and an inner lip of latch slide 144*a* extends over lid 120*a* to retain lid 120*a* in its closed position. When latch 140*a* is in the unlatched position, as shown in FIG. 9A, outer end 141*a* protrudes outwardly beyond exterior surface 31*a* to provide a tactile indicator to the user that latch 140*a* is unlatched. In some embodiments, lid 120*a* may further include a contrasting indicator mark 123*a*, such as a stripe or other highly visible mark, that is revealed when latch slide 144*a* is unlatched and pulled away from lid 120*a*. When latch 140*a* is in the latched position, the inner lip of latch slide 144*a* covers indicator mark 123*a*.

With reference to FIGS. 2 and 10, provided at a rear end 186 of reflex sight 20 is an elongate guideway 190, preferably in the form of undercut slot, such as a T-slot or dovetail slot for mounting accessories thereto. In other embodiments (not illustrated), guideway 190 may take the form of a rail, such as a T-rail, instead of an undercut slot. In still other embodiments, a different kind of mounting attachment point, such as a socket, pocket, hole or pin may be provided at the rear of reflex sight 20. An auxiliary rear iron sight assembly 60 is mounted in guideway 190 as further described below. Rear iron sight assembly 60 includes an iron sight block 194 having an open sight slot 198 that may be co-witnessed with illuminated aiming mark 46 (FIG. 6) of reflex sight 20 and a front iron sight 202 (FIG. 1) of weapon 24. Rear iron sight assembly 60 may enable the user to quickly switch or alternate with speed and confidence between the two sighting systems, and to provide a backup aiming device in the event of a failure of the electronics 110 of reflex sight 20, for example. Rear iron sight assembly 60 includes a traveler block 210 having a T-shaped rail 212 slidably mounted to guideway 190 and vertically adjustable therealong by an iron sight elevation adjustment screw 216 comprising a grub screw that bears against a backplate 230 (FIG. 10) of reflex sight 20 (and ultimately against slide 22 of weapon 24) to jack the traveler block 210 upwardly. A pair of set screws 234 are threaded into left and right side walls 72, 74 of base 30 and extend into guideway 190 to bear against traveler block 210 and secure the vertical position of traveler block 210 in guideway 190 once set. To change the vertical position of traveler block 210, set screws 234 must first be loosened.

In other embodiments (not illustrated), reflex sight 20 may include mounting features for fitting other commercially available iron sights or accessories. For example, rear end 186 of reflex sight 20 may include a lateral dovetail slot (not shown), that can be used to mount and dismount sight accessories, such as a rear iron sight accessory. In such an embodiment, the rear iron sight accessory may slide into the dovetail slot and be secured in a similar manner as described previously relative to the rear iron sight assembly 60. The rear iron sight accessory may be easily removed and replaced to allow the user to switch between various rear iron sight accessories or other accessories.

Figure 18:
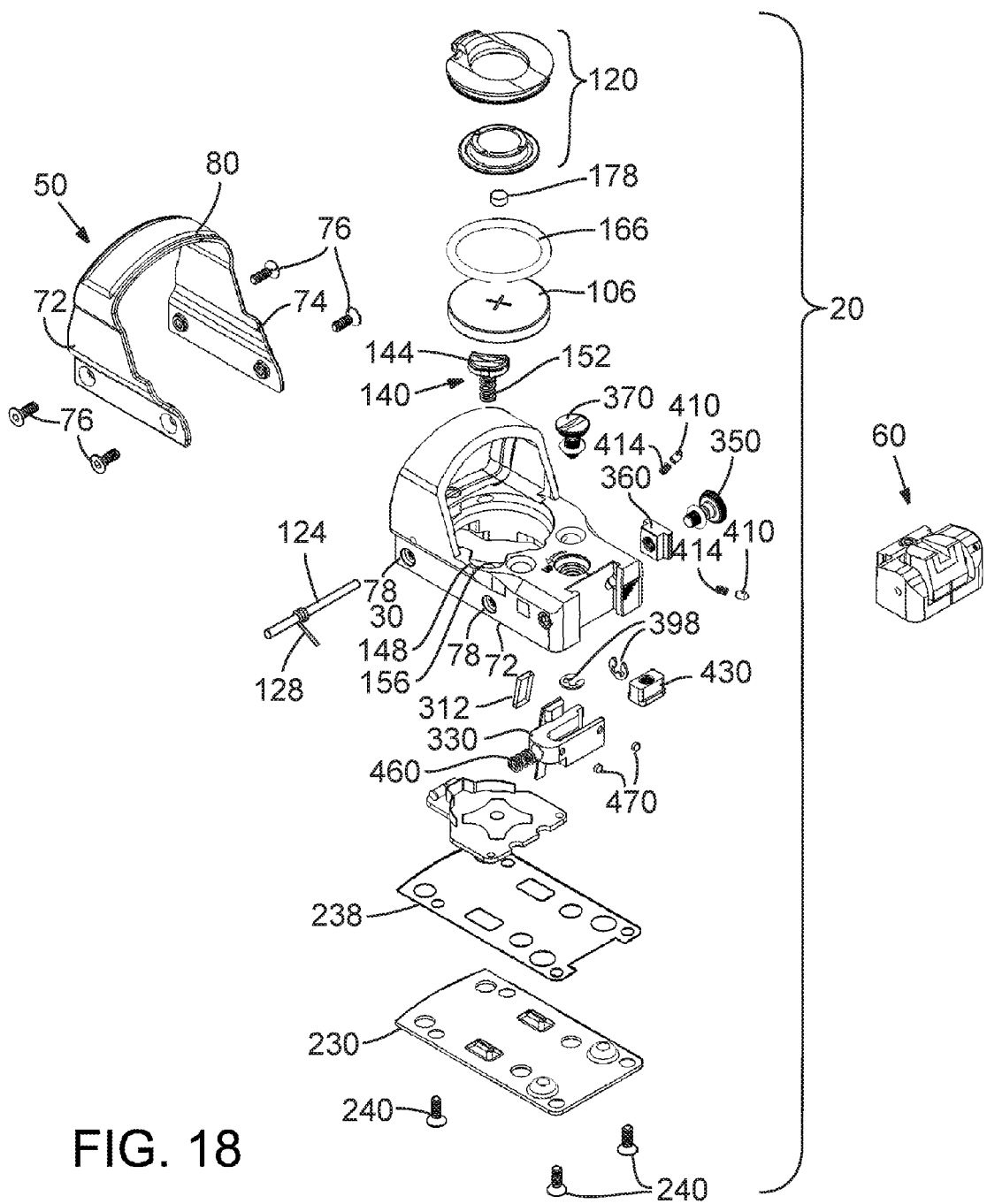
FIG. 18 is an exploded view of the reflex sight of FIG. 1.

With reference to FIGS. 10 and 18, a rubber gasket 238 is provided between backplate 230 and body 30 of reflex sight 20 and compressed therebetween by four screws 240 connecting backplate 230 to body 30 from below. Rubber gasket 238 is designed to prevent moisture from entering body 30. In another embodiment, not illustrated, a double sided film tape may be utilized to bond backplate 230 to body 30, which provides sealing and adhesion that allows screws 240 to be eliminated, thereby reducing cost. Improved waterproof performance was tested to a depth of 66 feet for two hours through the use of 3M VHB™ brand double-sided film tape in place of rubber gasket 238 and screws 240.

Figure 5:
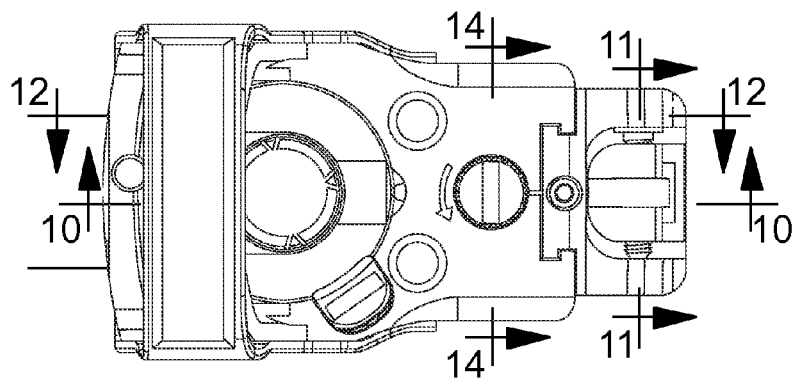
Figure 8:
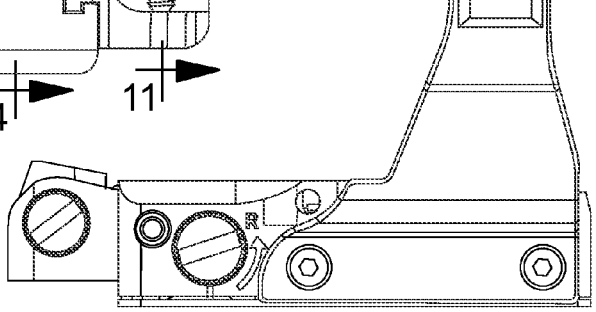
Figure 12:
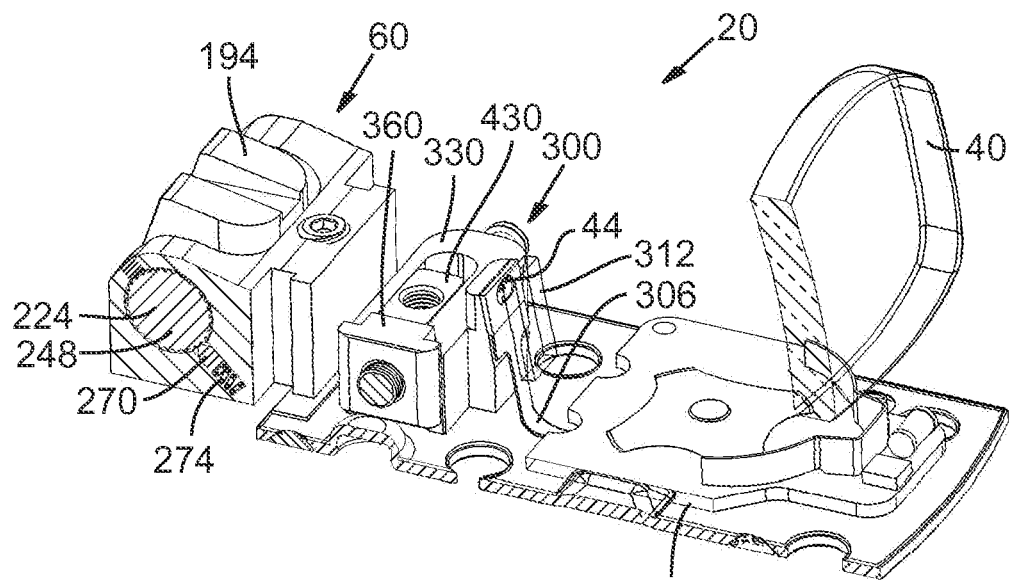
FIG. 12 is a partial side section view of the reflex sight of FIG. 1 taken along line 12-12 of FIGS. 5-6 with a housing and battery compartment lid of the reflex sight omitted to show detail of a positioning mechanism for an illumination module of the reflex sight and a circuit board of the reflex sight.

With reference to FIG. 11 showing a cross section of rear iron sight assembly 60 taken along line 11-11 of FIG. 5, rear iron sight block 194 is attached to traveler block 210 by a laterally-extending iron sight windage adjustment screw 224 for effecting horizontal or "windage" adjustments to the rear iron sight block 194. Windage adjustment screw 224 is supported on left and right stanchions 242, 244, with a head 248 of adjustment screw 224 seated in a counterbore 252 in right stanchion 244. A retaining clip, such as an E-clip 258, is attached to windage adjustment screw 224 in a groove between head 248 and a shoulder 262 of screw 224 to rotatably secure screw 224 to right stanchion 244. An O-ring 266 or other resilient member is positioned under head 248 and compressed between head 248 and the bottom of counterbore 252 to take up slop. With reference to FIG. 12 showing a partial cross section taken along line 12-12 of FIG. 5, head 248 of iron sight windage adjustment screw 224 includes detent grooves. A detent pin 270 is slidably received in a bore and urged toward head 248 by a click spring 274 captured in the bore, to thereby engage the detents on head 248 and facilitate incremental horizontal adjustment of iron sight block 194. As shown in FIG. 10, a resilient spacer bearing 280 is interposed between iron sight block 194 and traveler block 210 forwardly of windage adjustment screw 224 to prevent traveler iron sight block 194 from rocking about screw 224.

In some embodiments, the slide 22 of pistol 24 may include a dovetail slot sized for receiving various standard rear iron sights, such as a cut sight. With the dovetail slot in slide 22, a user may easily and quickly replace an iron sight assembly with a reflex sight assembly by simply sliding out the rear iron sight from the dovetail slot and slotting in the reflex sight. The reflex sight may, thus, include a dovetail wedge extending from a bottom surface of the sight to be slidably received in the dovetail slot for mounting the sight directly to the dovetail slot without other anchors or gunsmithing.

Positioning Mechanism for Aiming Mark Display Device (LED)

FIG. 12 is a partial side section view of reflex sight 20 taken along line 12-12 of FIGS. 5-6 with body 30 and battery compartment lid 120 omitted to show detail of a positioning mechanism 300 for LED 44 that generates an aiming mark reflected in the optical element of a reflex sight. LED 44 is coupled to electronics 110 (FIGS. 10 and 16) by a flex circuit 306. A transparent window 312 is mounted to body (not shown) in front of LED 44 to allow illumination from LED to pass therethrough and be reflected in lens 40 for generating the aiming mark 46 described above.

Figure 13:
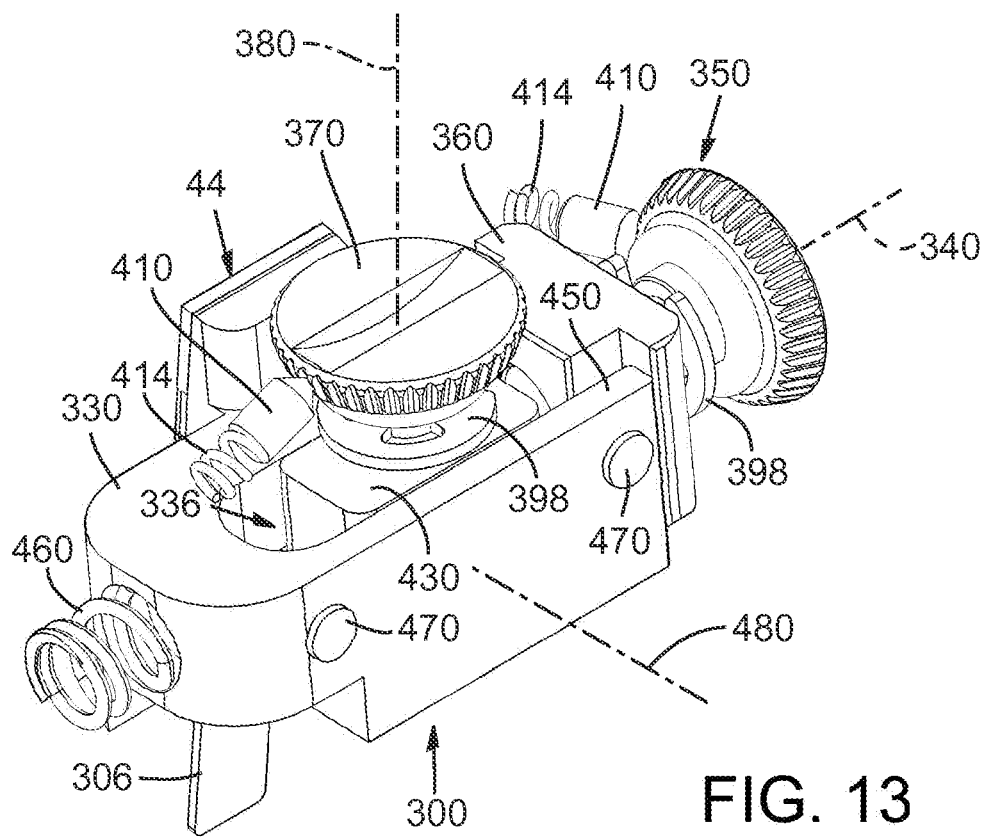
FIG. 13 is an enlarged rear right side isometric view of the positioning mechanism of FIG. 12.
Figure 14:
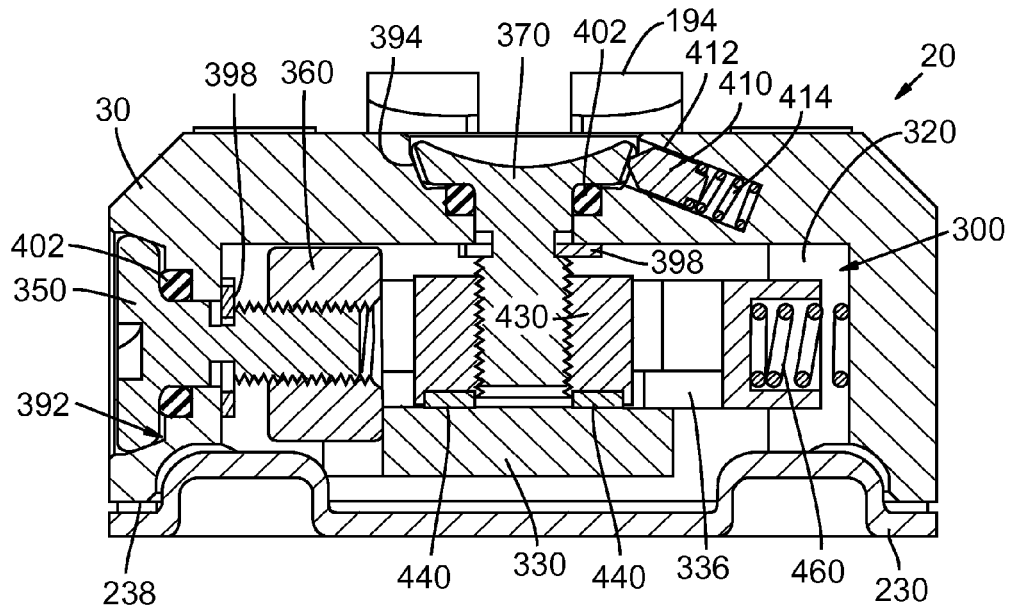
FIG. 14 is an enlarged section view of the reflex sight of FIG. 1 taken along line 14-14 of FIG. 5 to show detail of the positioning mechanism of FIG. 13.
Figure 15:
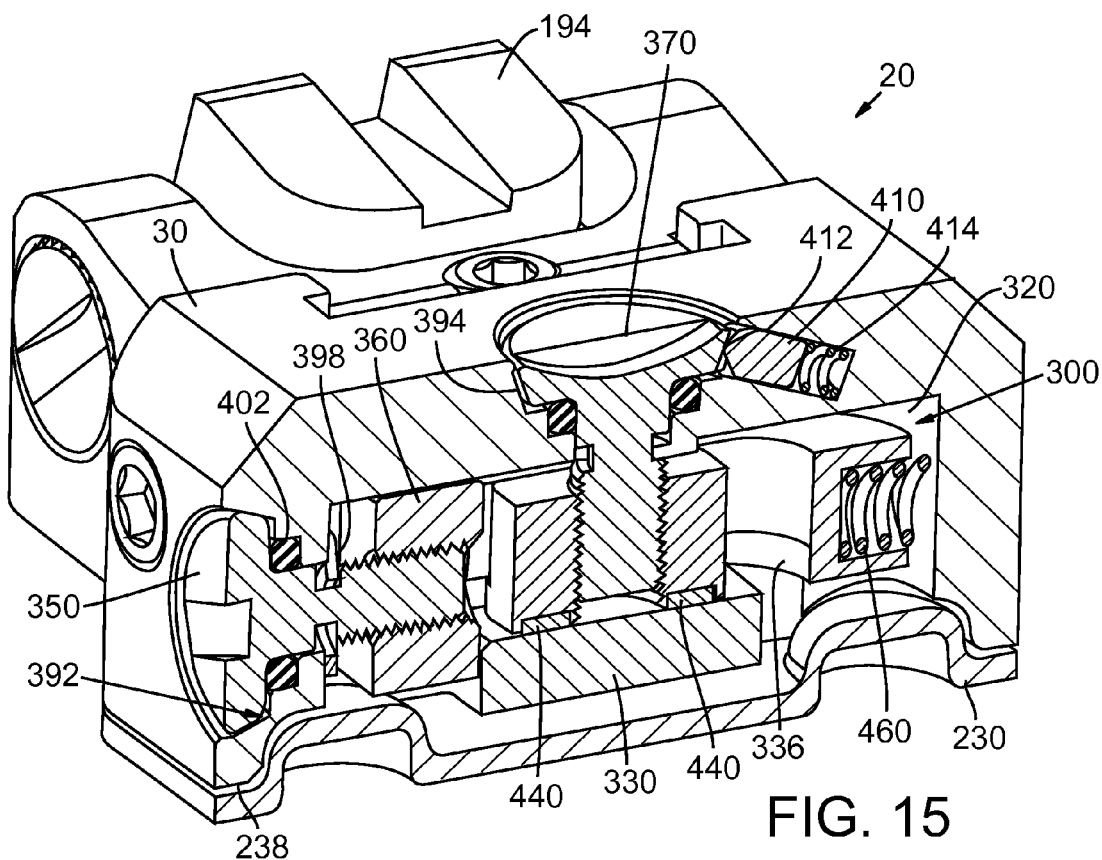
FIG. 15 is an enlarged isometric section view of the reflex sight of FIG. 1 taken along line 14-14 of FIG. 5.
Figure 17:
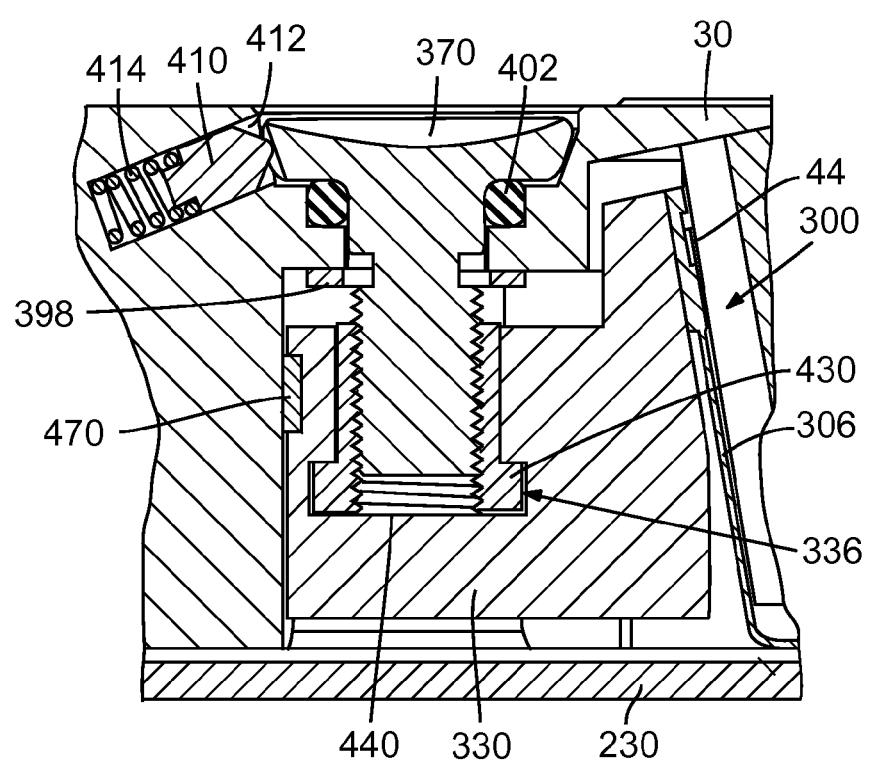
FIG. 17 is an enlarged detail side section view of the positioning mechanism illustrated in FIG. 16.

FIG. 13 is an enlarged right rear side isometric view of positioning system 300 with other parts of reflex sight 20 omitted. FIGS. 14-17 provide sectional views of reflex sight 20 and positioning system 300 along section lines described above in the Brief Description of the Drawings. With reference to FIGS. 13-17, base 30 has an elongate cavity 320 (FIG. 14) formed therein providing a platform relative to which positioning system 300 adjusts the position of the LED 44. LED 44 is supported on a carriage 330 of positioning system 300 that is slidably received in the cavity 320. As best illustrated in FIGS. 13 and 17, carriage 330 has formed therein an undercut slot 336 extending along a first axis of motion 340 (FIG. 13). Undercut slot 336 is preferably a T-slot, but may be made in other shapes, such as dovetailed for example. Slot 336 opens at a right-hand end of carriage 330 proximate a windage adjustment screw 350 and pusher block 360 of positioning system 300, described below.

An elevation adjustment screw 370 is rotatably supported on the base and extends into cavity 320 along a generally vertical second axis of motion 380 perpendicular to first axis 340. Windage and elevation adjustment screws 350, 370 extend through unthreaded countersunk holes 392, 394, respectively, in body 30, so that tapered heads of the adjustment screws 350, 370 are seated in the countersinks, and retained therein by E-clips 398 clipped to a shoulder groove of screws 350, 370 and abutting the internal walls of cavity 320. O-rings 402 seal adjustment screws 350, 370 to housing and urge them outwardly to take up slop. Click pins 410 are slidably received In angled bores 412 and urged by click springs 414 against detents in the tapered head surfaces of adjustment screws 350, 370 to provide incremental tactile feedback and to prevent inadvertent movement of screws 350, 370.

An elevation block 430 of positioning mechanism 300 is slidably received in undercut slot 336 of carriage 330 and threaded onto elevation adjustment screw 370 for movement of elevation block 430 and carriage 330 along second axis 380. Elevation block 430 may be shaped as a T-nut. In other embodiments (not illustrated), the T-slot arrangement may be reversed so that undercut slot 336 is formed in elevation block 430 and carriage 330 is seated in and linearly slidable along the undercut slot along first axis 340. A pair of elevation sizer bearings 440 are attached to a bottom surface of elevation block 430 and spaced apart so that they are interposed between elevation block 430 and a bottom of the undercut slot 336. Sizer bearings 440 take up slop between elevation block 430 and the undercut slot 336 while allowing carriage 330 to slide along first axis 340 relative to elevation block 430. Sizer bearings 440 may be self-lubricating plain bearing blocks or pads formed of a resilient resinous material, such as PTFE (polytetrafluoroethylene), for example. The threaded connection between elevation adjustment screw 370 and the threaded hole in elevation block 430 may be lined with a similar resin material to reduce or eliminate slop or backlash in the threads.

Windage adjustment screw 350 extends into cavity 320 along first axis 340 to adjust the position of carriage 330 along first axis 340. A pusher block 360 is threaded onto windage adjustment screw 350 and pushes against carriage 330 to drive carriage 330 along first axis 340 in response to rotation of windage adjustment screw 350. As best illustrated in FIG. 13, pusher block 360 is T-shaped to provide a guide rail along which vertical fingers 450 of carriage 330 are guided during vertical travel of carriage 330. In alternative embodiments (not shown), pusher block 360 may take a different shape providing a guide track for carriage 330. A spring 460 is interposed between a wall of cavity 320 and carriage 330 opposite pusher block 360 to urge carriage 330 toward pusher block 360 and windage adjustment screw 350. Horizontal sizer bearings 470 are interposed between carriage 330 and a rear wall of the cavity 320 to take up slop or tolerance deviations along a third axis 480 perpendicular to the first and second axes of motion 340, 380. In an alternative embodiment (not illustrated), horizontal sizer bearings 470 may be interposed between a front wall of carriage 330 and a forward wall of cavity 320. Backlash in the threads of windage adjustment screw 350 may be reduced or eliminated in the same manner as elevation adjustment screw 370, described above.

Figure 19:
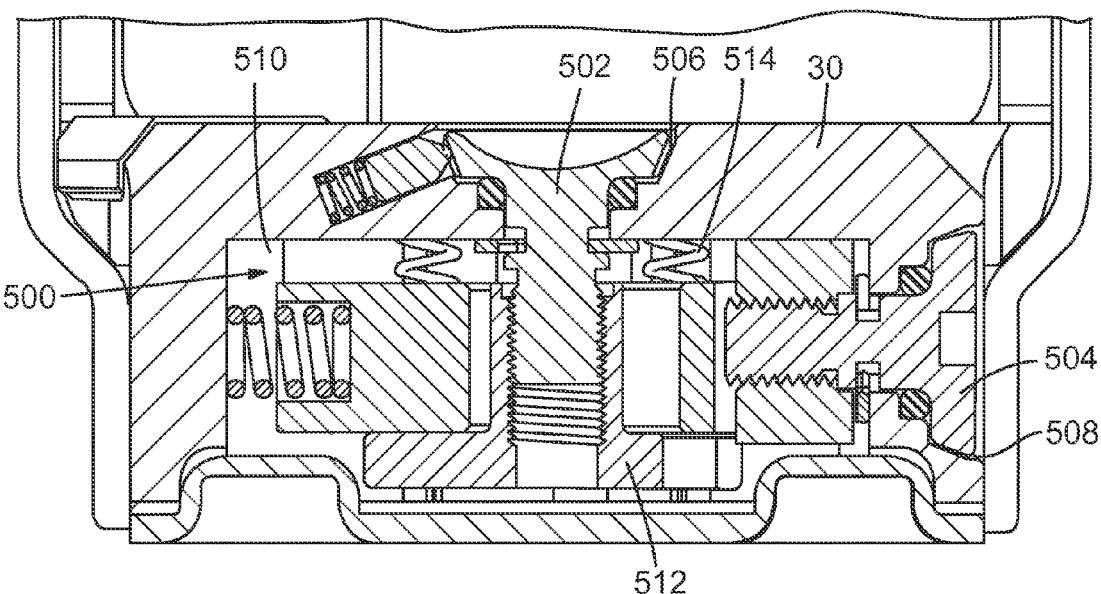
FIG. 19 is an enlarged lateral section view (an alternate to FIG. 14) illustrating another embodiment of a positioning mechanism for an illumination module of the reflex sight of FIG. 1.
Figure 20:
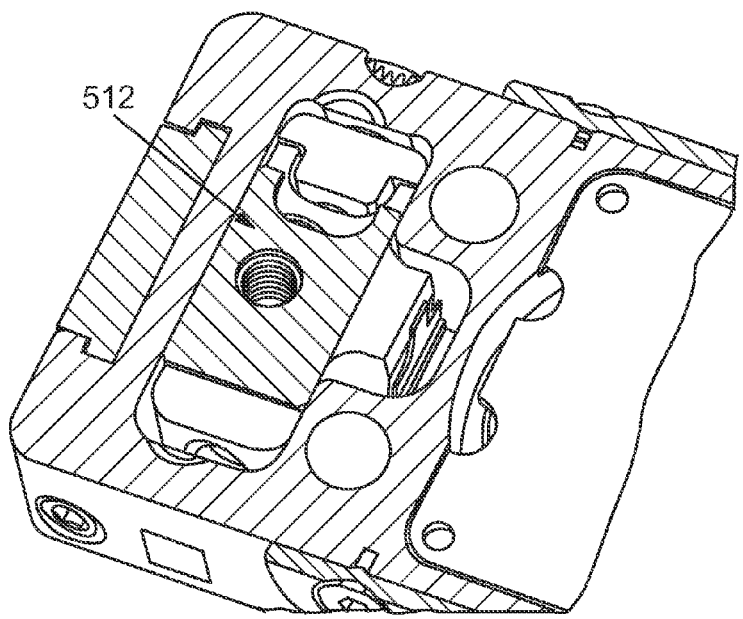
FIG. 20 is a bottom view of the positioning mechanism of FIG. 19 with a backplate of the reflex sight removed to show detail.

FIGS. 19-21 collectively illustrate another example embodiment of a positioning mechanism 500. The positioning mechanism 500 may include many of the same components as the positioning mechanism 300 that operate in the same or substantially similar manner as described with respect to the positioning mechanism 300. Accordingly, the following discussion may generally reference these components to provide a frame of reference with regard to the embodiment of FIGS. 20-21, but will not provide further detail to avoid repetition. With reference to FIGS. 19-21, windage and elevation adjustment screws 502, 504 extend through unthreaded countersunk holes 506, 508, and are secured against the internal walls of cavity 510 in a similar fashion as described previously with respect to positioning system 300. The elevation adjustment screw 502 is rotatably supported on the base and extends into cavity 510 along a generally vertical second axis of motion 380 (see FIG. 13) perpendicular to first axis 340 (see FIG. 13). An elevation block 512 is threaded onto elevation adjustment screw 502 for movement of the elevation block 512 along the second axis 380. With particular reference to FIG. 22, the elevation block 512 is positioned underneath the carriage 330, which supports the LED 44. In a similar fashion as described previously, movement of the elevation block 512 urges movement of the carriage 330 and adjustments of the LED 44. One or more springs 514 provide a downward force on top of the carriage 330 toward the elevation block 512 to stabilize the carriage 330, and to eliminate slop and backlash in the positioning mechanism 500, including in the threads of elevation adjustment screw 502.

Skilled persons will appreciate that positioning mechanism 300 may be used with other aiming devices other than reflex sights, to support illuminated aiming point display devices different from LED 44 to achieve precise positioning and adjustment of such display devices.

It will be obvious to those having skill in the art that many changes may be made to the details of the above-described embodiments without departing from the underlying principles of the invention. The scope of the present invention should, therefore, be determined only by the following claims.

The invention claimed is:

1. An aiming device, comprising:
a base having an elongate cavity formed therein;
a carriage slidably received in the elongate cavity, the carriage defining an undercut slot extending along a first axis of motion;
an aiming point display device supported on the carriage;
an elevation adjustment screw rotatably supported on the base and extending into the cavity along a second axis of motion perpendicular to the first axis of motion;
an elevation block slidably received in the undercut slot of the carriage and threaded onto the elevation adjustment screw for movement along the second axis of motion;
a sizer bearing interposed between a bottom of the undercut slot and the elevation block, the sizer bearing taking up slop between the elevation block and the undercut slot while allowing the carriage to slide along the first axis of motion relative to the elevation block; and
a windage adjustment screw rotatably supported on the base orthogonally to the elevation adjustment screw and extending into the cavity along the first axis of motion to adjust the carriage along the first axis of motion.

2. The aiming device of claim 1, further comprising at least one second sizer bearing interposed between the carriage and a wall of the elongate cavity to take up slop along a third axis perpendicular to the first and second axes of motion.

3. The aiming device of claim 1, wherein the sizer bearing is a self-lubricating plain bearing element made of a plastic material.

4. The aiming device of claim 1, further comprising a pusher block threaded onto the windage adjustment screw and pushing against the carriage to drive the carriage along the first axis of motion in response to rotation of the windage adjustment screw.

5. The aiming device of claim 1, wherein the aiming device is a reflex sight and the aiming point display device includes a miniature light emitting diode.

6. The aiming device of claim 3, wherein the plastic material is polytetrafluoroethylene.

7. The aiming device of claim 1, wherein the elevation adjustment screw includes detents in a tapered head surface, and the base includes an angled bore, the aiming device further including:
a click spring received in the angled bore; and
a click pin slidably received in the angled bore and directly abutting the tapered head of the elevation adjustment screw and the click spring.

8. The aiming device of claim 1, wherein the windage adjustment screw includes detents in a tapered head surface, and the base includes an angled bore, the aiming device further including:
- a click spring received in the angled bore; and
- a click pin slidably received in the angled bore and directly abutting the tapered head of the windage adjustment screw and the click spring.

9. The aiming device of claim 1, wherein the sizer bearing includes a spaced-apart pair of bearing elements.

10. The aiming device of claim 2, wherein each of the sizer bearing and the second sizer bearing includes a spaced-apart pair of bearing elements.

\* \* \* \* \*